REED & PENNEWELL.
Hand Seeder.
No. 57,259.  Patented Aug. 14, 1866.
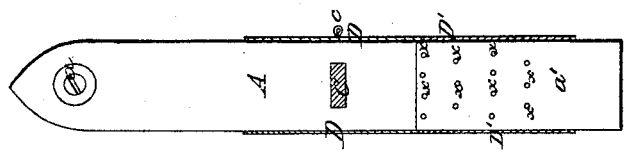
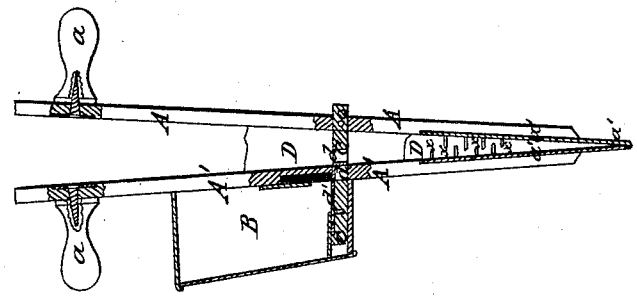
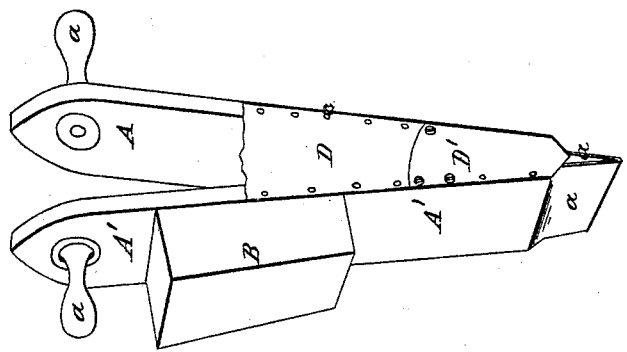

UNITED STATES PATENT OFFICE.

HENRY REED AND WILLIAM P. PENNEWELL, OF MIDDLETOWN, MISSOURI, ASSIGNORS TO THEMSELVES AND WALTER CALDWELL, OF SAME PLACE.

IMPROVEMENT IN CORN-PLANTERS.

Specification forming part of Letters Patent No. 57,259, dated August 14, 1866.

*To all whom it may concern:*

Be it known that we, HENRY REED and WILLIAM P. PENNEWELL, of Middletown, in the county of Montgomery and State of Missouri, have invented a new and useful Improvement in Corn-Planters; and we do hereby declare that the following is a full, clear, and exact description thereof, reference being had to the accompanying drawings, and to the letters of reference marked thereon.

Figure 1 of the accompanying drawings is an elevation, in perspective, of one of the improved planters. Fig. 2 is a sectional elevation of the same, taken through the longitudinal axis of the handles and the transverse vertical axis of the hopper. Fig. 3 is a sectional elevation of the planter, taken in a plane parallel with the faces of the upright side pieces, A A', and midway between them.

The nature of this invention consists, first, in arranging the opening in the slide in the bottom of the hopper so as to permit seed of any size to be planted.

The invention relates, secondly, to the introduction of a number of wire or iron teeth inserted into the inner faces of the side pieces, A A', near their lower ends, for the purpose of scattering the seed.

The side pieces, A A', provided with the handles $a$ $a$ near their upper ends and the metallic shoes $a'$ $a'$ at their lower ends, and the seed-hopper B, attached to the piece A', near the middle part of it, are so precisely similar to corn-planters now in use and already patented that no particular explanation of these parts will be attempted here.

The seed-slide C, which is fastened to the side piece, A, by means of the pin $c$, passing through both of these parts, has an orifice, $d$, through it, as in other similar planters, into which the seed drops when the slide is shoved in under the hopper B by pressing the handles $a$ $a$ together, and which retains the seed so acquired and draws it out with the slide C, from which it is dropped down into the cavity formed by the two upright pieces A A and the flexible side pieces, D, and hinge-pieces D', which unite the pieces A A' together.

The orifice $d$ may be increased or diminished at pleasure by moving the metallic guide $d'$ in the required direction. The guide $d'$ is fastened to the slide C by means of a set-screw, so it may be readily adjusted.

As the slide C is only held fast in the piece A by the pin $c$, it may be very readily removed and a new piece, C, inserted instead, in cases of seeds varying too much in size to be planted by means of one slide-piece, though its orifice be regulated by the guide $d'$.

In this description this machine is described as a corn-planter, as that was the only purpose to which machines of this construction could be applied.

By constructing the slide C as above described a machine can be constructed that will plant corn, broom-corn, sorghum, or any other seed that a farmer may desire to plant with equal facility.

In order to spread or scatter the seeds as they fall into the ground the two adjacent sides of the pieces A A' are studded with a number (two or more) of short iron teeth or wires, $x$, near their lower ends.

Having described our invention, what we claim is—

The short iron teeth or wires $x$ when attached to the pieces A A' for the purpose of scattering the seed.

HENRY REED.
WILLIAM P. PENNEWELL.

Witnesses:
SENECA W. HAMMACK,
THOMAS J. BENTLEY.